(12) United States Patent
Bai et al.

(10) Patent No.: US 11,472,999 B1
(45) Date of Patent: Oct. 18, 2022

(54) WATER-BASED GEL-CONSOLIDATION TYPE LOST CIRCULATION MATERIAL SYSTEM SUITABLE FOR FRACTURED LOST CIRCULATION FORMATION, PREPARATION METHOD AND USE THEREOF

(71) Applicant: China University of Petroleum (East China), Qingdao (CN)

(72) Inventors: Yingrui Bai, Qingdao (CN); Jinsheng Sun, Qingdao (CN); Kaihe Lv, Qingdao (CN); Jingping Liu, Qingdao (CN); Xianbin Huang, Qingdao (CN); Jintang Wang, Qingdao (CN); Jiafeng Jin, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 4 days.

(21) Appl. No.: 17/565,342

(22) Filed: Dec. 29, 2021

(30) Foreign Application Priority Data

Nov. 5, 2021 (CN) .......................... 202111306347.5

(51) Int. Cl.
*C09K 8/487* (2006.01)
*C08G 77/18* (2006.01)
*C04B 28/02* (2006.01)
*C04B 24/42* (2006.01)
*C04B 24/38* (2006.01)
*C04B 24/12* (2006.01)
*C08J 3/075* (2006.01)
*C04B 103/40* (2006.01)
*C08G 77/00* (2006.01)
*C04B 103/00* (2006.01)

(52) U.S. Cl.
CPC ............ *C09K 8/487* (2013.01); *C04B 24/124* (2013.01); *C04B 24/128* (2013.01); *C04B 24/38* (2013.01); *C04B 24/42* (2013.01); *C04B 28/02* (2013.01); *C08G 77/18* (2013.01); *C08J 3/075* (2013.01); *C04B 2103/0049* (2013.01); *C04B 2103/0062* (2013.01); *C04B 2103/40* (2013.01); *C08G 77/80* (2013.01); *C08J 2305/00* (2013.01); *C08J 2483/06* (2013.01)

(58) Field of Classification Search
None
See application file for complete search history.

*Primary Examiner* — Jeffrey D Washville
(74) *Attorney, Agent, or Firm* — Calfee Halter & Griswold LLP

(57) ABSTRACT

The present discloses a water-based gel-consolidation type lost circulation material system suitable for fractured lost circulation formation, preparation method and use thereof.

9 Claims, No Drawings

WATER-BASED GEL-CONSOLIDATION TYPE LOST CIRCULATION MATERIAL SYSTEM SUITABLE FOR FRACTURED LOST CIRCULATION FORMATION, PREPARATION METHOD AND USE THEREOF

PRIORITY CLAIM & CROSS REFERENCE

The application claims priority to Chinese Application No. 202111306347.5, filed on Nov. 5, 2021 entitled "water-based gel-consolidation type lost circulation material system suitable for fractured lost circulation formation, preparation method and use thereof", which is herein specifically and entirely incorporated by reference.

FIELD

The present disclosure relates to the technical field of plugging with drilling fluids in the petroleum exploration and development, and in particular to a water-based gel-consolidation type lost circulation material system suitable for use in fractured lost circulation formation, a preparation method and an use thereof.

BACKGROUND

The energy sources in the world have shifted from an era of the conventional oil and gas exploration to the unconventional oil and gas exploration, the exploitation scale of oil and gas resources in the geological condition of complex formation has continuously expanded, lost circulation becomes one of the common downhole troublesome conditions during the development process. The lost circulation may induce troublesome conditions such as pressure drops in the borehole, collapse and instability of the borehole wall. The lost circulation not only affects the drilling rate, but also gives rise to significant economic losses, thus the drilling fluid is subjected to the stringent and harsh requirements. Furthermore, the lost circulation can be categorized into four types according to the types of lost circulation channels, namely the pore lost circulation, fissure lost circulation, cavernous lost circulation, and complex lost circulation, wherein the fissure lost circulation is one of the most common lost circulation types, it is a hot spot and a gordian knot in the current leak-proof and plugging technologies.

The current solution for addressing the problem of avoiding lost circulation of the water-based drilling fluids mainly resides in plugging with a plugging agent accompanied with the drilling process, high filtrate loss pressure-bearing plugging agent, a bridge connection plugging agent, a cement slurry and a gel plugging agent, and has produced many desirable results, but a variety of products have different functions and time limits.

CN112480887A discloses a cellulose-based temperature-sensitive gel plugging agent and a preparation method thereof, the plugging agent is not affected by the leak-off size of the formation, and has enhanced strength and improved pressure-bearing performance after the crosslinking and curing process, the pressure-bearing experimental pressure of the pores and fractures may be up to 5 MPa or more, and can plug the lost circulation formation in a shorter time, thereby producing a desirable lost circulation-proof and plugging effect. However, the gel plugging agent is a cellulose-based temperature-sensitive gel, its pressure-bearing strength is inferior to the rigid plugging agent, and the plugging agent is composed of a plurality of ingredients and the preparation process is cumbersome.

CN111117582A discloses a controllable cross-linking type gel plugging agent and a preparation method thereof. The controllable cross-linking type gel plugging agent provided by the present disclosure has a controllable gel formation time, can effectively plug the complex lost circulation formation such as the fracture developed formation and fragmented formation. However, the patent discloses that the vinyl monomer reacts with the N,N-methylene bisacrylamide under the action of an initiator to form a polymer main agent, the polymer main agent is mixed with a cross-linking agent to obtain a controllable cross-linking gel, which has a slightly insufficient overall strength.

CN112646555A discloses a three-stage plugging agent suitable for a fractured lost circulation formation, and a preparation method and a plugging method thereof, it comprises three stages of plugging agent, namely a I-stage plugging agent, a II-stage plugging agent, and a III-stage plugging agent, but the plugging agent has a relatively narrow range of applicability during use. Furthermore, the three plugging agents are not combined together, the operation time is relatively long, and the steps are cumbersome.

There are many inherent problems for the various types of plugging agents: (1) the bridge connection plugging materials are mainly dependent on a temporarily plugging layer formed by the deposition function, and have insufficient pressure-bearing capacity; (2) the chemical materials mainly rely on cross-linking reactive gels of polymers to plug the lost circulation formation, it has a wide adjustable range and desired thixotropy properties. However, the chemical materials are costly and merely exhibit excellent plugging performance for small-scale fractures, the materials do not work well when the fracture dimensions increase; and (3) the cement slurry per se has very weak anti-contamination property and is prone to affect the plugging property of a drilling fluid after mixing with the drilling fluid. The cement slurry has high pressure-bearing strength, but it is difficult to accurately control the curing time of cement, and the cement has poor retention property in the fractures of the lost circulation formation.

Therefore, it has an important significance to research and develop a plugging agent with desirable properties.

SUMMARY

The purpose of the present disclosure is to overcome the defective problems in the prior art that a single plugging agent has an insufficient pressure-bearing capacity, the gel plugging agent has a slightly insufficient strength, the cement has poor retention property; the chemical materials of the gel plugging agent has high costs, the curing time of an inorganic plugging agent cannot be precisely controlled, and the plugging agent has poor resistance to water invasion, and provide a water-based gel-consolidation type lost circulation material system suitable for use in fractured lost circulation formation, a preparation method and a use thereof, the plugging agent can withstand a high plugging pressure.

In order to fulfill the above purpose, a first aspect of the present disclosure provides a silicone resin, wherein the silicone resin has a structure represented by Formula (1):

Formula (1)

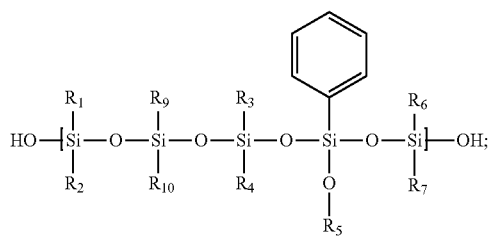

Formula (2)

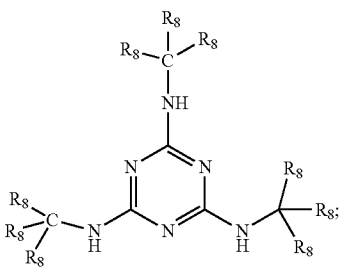

Formula (3)

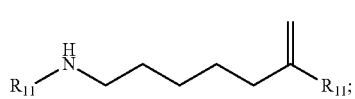

where in Formula (1), $R_1$ is H; $R_2$ is H or an alkyl of $C_1$-$C_3$; $R_3$ is H or an alkyl of $C_1$-$C_4$; $R_4$ is H or an alkyl of $C_1$-$C_4$; $R_5$ is H or a benzene ring; $R_6$ is H or an alkyl of $C_1$-$C_4$; $R_7$ is H or an alkyl of $C_1$-$C_4$; $R_9$ and $R_{10}$ are the same or different, each is a phenyl group or an alkyl of $C_1$-$C_4$.

In a second aspect, the present disclosure provides a method for preparing the aforesaid silicone resin including:

(Y1) subjecting an alcohol, an acid and a first water to a first contact to obtain a mixed solution A;

(Y2) subjecting a silicon-containing monomer, an ethylenic monomer and a second water to a second contact to obtain a mixed solution B;

(Y3) contacting the mixed solution A and the mixed solution B and carrying out reaction in the presence of an ester-containing peroxide initiator, a cross-linking agent and a third water, and subjecting a reaction product to precipitation isolation, washing, drying and grinding treatment to prepare a silicone resin.

In a third aspect, the present disclosure provides a silicone resin capsule comprising a core and a shell coated outside the core, wherein the core is the aforesaid silicone resin.

In a fourth aspect, the present disclosure provides a method of preparing the aforesaid silicone resin capsule including:

(J1) contacting a toluene solution containing a first monomer with an aqueous solution containing a second monomer and carrying out reaction to obtain a prepolymer solution; wherein the first monomer is one or more selected from the group consisting of trimethylolpropane, trimethylundecane and trimethylaminomethane; the second monomer is one or more selected from the group consisting of toluene diisocyanate, xylylene diisocyanate and 1,3-propane diisocyanate;

(J2) contacting a polymer material, a cross-linking agent, a water-soluble binder and water to obtain a mixed solution C;

(J3) contacting a silicone resin with an oil phase containing an emulsifier to obtain a mixed solution D;

(J4) contacting the mixed solution D with the mixed solution C under the stirring conditions to obtain an oil-in-water emulsion;

(J5) dropwise adding the prepolymer solution to the oil-in-water emulsion to carry out reaction, and subjecting a reaction product to filtration, washing, and drying treatment to obtain a silicone resin capsule.

A fifth aspect of the present disclosure provides a temperature-sensitive gel comprising a gel main agent and a cross-linking agent, wherein the cross-linking agent is the aforesaid silicone resin or the aforesaid silicone resin capsule.

A sixth aspect of the present disclosure provides a modified settable material, wherein the modified settable material has the structure represented by Formula (2) or Formula (3):

wherein $R_8$ and $R_{11}$ are the same or different, and each is $CH_3CH_2OH$, $CH_2OH$ or $CH_3CH_3CH_3CH_2OH$.

In a seventh aspect, the present disclosure provides a method for preparing an aforesaid modified settable material including:

(K1) contacting a settable material, a modifying co-agent and water to obtain a mixed solution E;

(K2) reacting the mixed solution E, a alkaline solution containing monomer A and monomer B with an alcohol solution containing a surfactant to obtain the modified settable material;

wherein the monomer A is one or more selected from the group consisting of hydroxybenzenes, chlorobenzenes and benzoic acid, and the monomer B is one or more selected from the group consisting of furan formaldehyde, trans-2-hexenal and trimethylheptenal.

In an eighth aspect, the present disclosure provides a water-based gel-consolidation type lost circulation material system, wherein the lost circulation material system comprises an aforesaid temperature-sensitive gel, and a modified settable material, a curing agent and a cement composition as previously mentioned.

In a ninth aspect, the present disclosure provides a use of the aforesaid lost circulation material system in the fractured lost circulation formation.

Due to the above-mentioned technical schemes, the present disclosure exhibits the following advantages:

(1) The structure and properties of the temperature-sensitive gel provided by the present disclosure vary with the temperature from a low temperature to a high temperature, and the cross-linking agent in the temperature-sensitive gel can use the double bonds as the bridge group and cross-link the polymer molecules, thereby curing the polymer molecules. In addition, the cross-linking agent is encapsulated in the shell of the multi-layer composite capsule, thereby controlling the setting time of the gel.

(2) The surface of the settable material provided by the present disclosure is subjected to grafting to introduce multiple hydroxyl groups, such a process can improve strength of the composite gel plugging agent.

(3) The plugging agent provided by the present disclosure can reduce costs of the plugging materials, enhance the temperature resistance capacity and strength of the cured materials of the gel, thereby effectively plugging the formation.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As described above, a first aspect of the present disclosure provides a silicone resin, wherein the silicone resin has a structure represented by Formula (1):

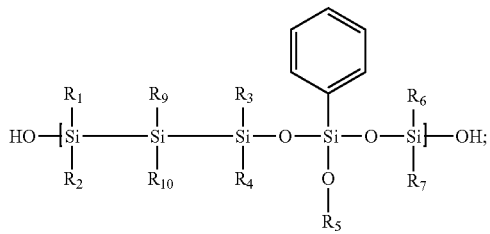

Formula (1)

where in Formula (1), $R_1$ is H; $R_2$ is H or an alkyl of $C_1$-$C_3$; $R_3$ is H or an alkyl of $C_1$-$C_4$; $R_4$ is H or an alkyl of $C_1$-$C_4$; $R_5$ is H or a benzene ring; $R_6$ is H or an alkyl of $C_1$-$C_4$; $R_7$ is H or an alkyl of $C_1$-$C_4$; $R_9$ and $R_{10}$ are the same or different, each is a phenyl group or an alkyl of $C_1$-$C_4$.

The inventors of the present disclosure have unexpectedly discovered that the alkyl side chains of the silicone resin are prone to thermo-oxidative degradation, and can react with terminal hydroxyl groups to cross-link the siloxane and introduce the siloxane chain segments, and form the polymers of backbone structure consisting of si-o-si bonds; the silicone resin exhibits superior thermal stability due to the excellent physicochemical properties of siloxane bonds; in addition, benzene rings are introduced into the molecular chains, the grafted benzene ring structure reacts with polymers to form a mosaic structure on the chain segments, so as to form the silicone resin with si-o-si and benzene rings as the backbone and further improve the thermal stability of the silicone resin, and can increase the rigidity and temperature resistance properties of chain segments of the silicone resin.

Further, the temperature-sensitive gel polymer of the present disclosure has hydrogen-bond interaction between the hydrophilic group and water molecule of the macromolecule during a low temperature, and the inter-molecular interactions combine with the molecular hydrogen-bond to form a complex tertiary structure, the molecular structure has a helical shape. When the temperature rises, the distance between the helical structures of the micellar molecules is shortened, the denseness of the temperature-sensitive gel polymer is increased. The cross-linking agent comprises a methacryloxypropyl-containing functional group having a high reactivity and double bond, the polymer molecules are cross-linked by using the double bond as the bridge base and subsequently cured. Moreover, the cross-linking agent is coated by the shell of the multi-layered composite capsule, thereby controlling the setting time of the gel.

Further, the strength of the composite gel plugging agent is increased by grafting a plurality of hydroxyl groups on a surface of the settable material, and forming hydrogen bonds with water molecules to improve the acting force. In addition, the curing agent is a composite of an intermediate temperature curing agent and a high temperature curing agent, and the reasons for adopting the multi-stage curing is that the gradient curing is conducive to an increase of the denseness of the plugging slurry, and the reduction of the filtrate amount of the gel solution.

Furthermore, the modified settable material is miscible with the temperature-sensitive gel to increase the strength and temperature resistance of the gel, in combination with the setting of cement, the modified settable material forms hydrogen-bond interaction with the temperature-sensitive gel, oxygen atoms on the surface of the cement, thereby forming a water-based gel-consolidation type lost circulation material system.

According to the present disclosure, it is preferable that each of $R_1$, $R_2$ and $R_5$ is H, each of $R_3$, $R_4$, $R_6$ and $R_7$ is $CH_3$; $R_9$ and $R_{10}$ are the same or different, each is a phenyl or $CH_3$.

In a second aspect, the present disclosure provides a method for preparing an aforesaid silicone resin including:

(Y1) subjecting an alcohol, an acid and a first water to a first contact to obtain a mixed solution A;

(Y2) subjecting a silicon-containing monomer, an ethylenic monomer and a second water to a second contact to obtain a mixed solution B;

(Y3) contacting the mixed solution A and the mixed solution B and carrying out reaction in the presence of an ester-containing peroxide initiator, a cross-linking agent and a third water, and subjecting reaction product to precipitation isolation, washing, drying and grinding treatment to prepare a silicone resin.

According to the present disclosure, the alcohol is preferably ethanol and the acid is preferably acetic acid.

In accordance with the present disclosure, the silicon-containing monomer is at least one selected from the group consisting of methyl orthosilicate, triethoxymethylsilane, dimethoxydiphenylsilane and trimethoxysilane.

According to the present disclosure, the ethylenic monomer is at least one selected from the group consisting of hydroxyethyl methacrylate, hydroxypropyl methacrylate and N-methylolacrylamide.

In accordance with the present disclosure, the ester peroxide initiator is tert-butyl peroxobenzoate and/or tert-butyl peroxopentanoate.

According to the present disclosure, the cross-linking agent is at least one selected from the group consisting of bis-2,4-dichlorobenzoyl peroxide, α-methylstyrene and ethylene glycol dimethacrylate.

In the present disclosure, the water is preferably deionized water; the ethanol is anhydrous ethanol.

According to the present disclosure, it is preferable in step (Y1) that the anhydrous ethanol and hydrochloric acid are subjected to a first contact with deionized water in a container at a certain concentration ratio and stirred uniformly to obtain a mixed solution A; wherein the condition of the first contact comprises initially adding a certain amount of the deionized water and the hydrochloric acid, stirring the mixture at room temperature, and adding a part of the anhydrous ethanol; wherein the stirring rate is 100-300 r/min, and the stirring time is 3-4 h.

According to the present disclosure, the silicone monomers and the ethylenic monomers are respectively weighted at a certain mass in step (Y2), and are subjected to a second contact with deionized water in a three-port flask according to a ratio of concentrations, the mixed solution in the three-port flask is continuously stirred, and the three-port flask is placed in a water bath kettle, and the temperature is adjusted to be within a range of 45-60° C., the mixed solution is continuously stirred for 30-60 min to obtain a mixed solution B.

In accordance with the present disclosure, in step (Y3), an appropriate amount of ester peroxide initiator may be initially weighted and placed in a container including deionized water therein, the mixture is continuously stirred for 15 min to obtain an initiator solution. The mixed solution A is then added into the mixed solution B, the reaction temperature is adjusted to be within a range of 85-135° C., preferably 90-135° C., the blended solution is continuously stirred, an initiator solution is added to carry out a reaction, and the reaction is terminated at 4-6 h, preferably 2-6 h, to obtain a high temperature organic cross-linking agent, the hydrochloric acid solution on the product is removed, pH is adjusted to neutral, and the product is finally subjected to precipitation isolation, washing, drying and grinding treatment to obtain the solid phase cross-linking agent in powder form. Wherein the drying condition comprises the vacuum drying at 60-80° C. for 12-24 h; the grinding speed is 20,000-25,000 r/min, and time is 3-5 min, and the cross-linking agent shall be uniformly dispersed to a powder form without agglomeration.

According to the present disclosure, the alcohol is 10-20 parts by weight, and the acid is 5-10 parts by weight, relative to 100 parts by weight of the first water.

According to the present disclosure, the silicon-containing monomer is 30-50 parts by weight, and the olefinic monomer is 20-30 parts by weight, relative to 100 parts by weight of the second water.

According to the present disclosure, the ester peroxide initiator is 3-5 parts by weight, and the cross-linking agent is 5-10 parts by weight, relative to 100 parts by weight of the third water.

In a third aspect, the present disclosure provides a silicone resin capsule comprising a core and a shell coated outside the core, wherein the core is the aforesaid silicone resin.

According to the present disclosure, silicone resin is fabricated into microcapsule particles. The microcapsule is mainly composed of a core consisting of a core material and a shell consisting of a wall material, i.e., the material inside the capsule is the core material, and the wrapping material is the wall material. The silicone resin is in powder form and is water-insoluble during the direct use, it acts as the core material. The microcapsule wall material is thermoplastic, the temperature rise may cause the wall material to soften and rupture to release the core material.

According to the present disclosure, the shell is a polyurethane microcapsule shell, and the wall material of the shell is polyurethane.

According to the present disclosure, the slow release time can be regulated by adjusting a thickness of the capsule wall material according to the formation temperature, when the stirring speed is within a range of 8,000-12,000 r/min, the shell having a thickness of 1-10 μm, preferably 1-5 μm, can be formed, and if it is required to increase the shell thickness, the stirring speed can be decreased.

According to the present disclosure, the decomposition temperature of the shell is within a range of 80-140° C., preferably 100-120° C. In the present disclosure, the encapsulation rate of the capsule core can be further improved by adjusting the concentration of the capsule material (e.g., the thickness of said shell) so as to increase the thermal decomposition rate of the wall material.

In a fourth aspect, the present disclosure provides a method for preparing the aforesaid silicone resin capsule including:

(J1) contacting a toluene solution containing a first monomer with an aqueous solution containing a second monomer and carrying out reaction to obtain a prepolymer solution; wherein the first monomer is at least one selected from the group consisting of trimethylolpropane, trimethylundecane and trimethylaminomethane; the second monomer is at least one elected from the group consisting of toluene diisocyanate, xylylene diisocyanate and 1,3-propane diisocyanate;

(J2) contacting a polymer material, a cross-linking agent, a water-soluble binder and water to obtain a mixed solution C;

(J3) contacting a silicone resin with an oil phase containing an emulsifier to obtain a mixed solution D;

(J4) contacting the mixed solution D with the mixed solution C under the stirring conditions to obtain an oil-in-water emulsion;

(J5) dropwise adding the prepolymer solution to the oil-in-water emulsion to carry out reaction, and subjecting reaction products to filtration, washing, and drying treatment to obtain a silicone resin capsule.

According to the present disclosure, a certain amount of the first monomer is added to a solution containing an appropriate amount of toluene in step (J1), a certain amount of an aqueous solution of the second monomer is added, the pH of the solution is adjusted to be 3-5, the temperature is adjusted by heating in an oil bath at 80-95° C., nitrogen gas is introduced, and the reaction is performed for 3-5 h till the completion of said reaction, so as to obtain a prepolymer solution, which is cooled to the room temperature.

According to the present disclosure, an appropriate amount of the polymer material is weighted in step (J2) to contact with an appropriate amount of deionized water retained in a container, a cross-linking agent and a water-soluble binder are added, the temperature is increased to 85-90° C., the mixed solution is stirred at a rotational speed of 1,500-3,000 r/min for 1-3 h, the materials are sufficiently dissolved and subsequently cooled to room temperature, so as to obtain a mixed solution C.

According to the present disclosure, the polymer material is at least one selected from the group consisting of starch, gelatin and protein; the cross-linking agent is at least one selected from the group consisting of divinylbenzene, m-dihydroxybenzene and hydroxyethyl acrylate; and the water soluble binder is at least one selected from the group consisting of dextrin, polyvinyl alcohol and carboxymethyl cellulose.

According to the present disclosure, the first monomer and the second monomer are used in a total amount of 40-60 parts by weight, the polymer material is used in an amount of 3-5 parts by weight, the cross-linking agent is used in an amount of 6-8 parts by weight, and the water-soluble binder is used in an amount of 4-6 parts by weight, relative to 100 parts by weight of water.

According to the present disclosure, the weight ratio of the used amount of the first monomer to the used amount of the second monomer is 1:(2-4), preferably 1:2.

According to the present disclosure, a certain amount of the emulsifier is dissolved in an appropriate amount of the oil phase in step (J3), and a certain amount of the silicone resin used as the core material is then added under a stirring condition, and the temperature of water bath is adjusted to be within a range of 50-80° C., the mixture is subjected to stirring at 1,000-3,000 r/min and emulsification for 1-2 h, so as to obtain the mixed solution D.

According to the present disclosure, the emulsifier is at least one selected from the group consisting of sorbitan monooleate, dehydrated sorbitan monooleate and dodecyl phenol polyoxyethylene ether (op-10).

According to the present disclosure, the oil phase is selected from diesel oil or white oil, the diesel oil is preferably 0" diesel oil. The emulsification and dispersion of the oil phase in the water phase is an important step. One important factor influencing the emulsification and dispersion is stirring, the higher is the stirring speed, the smaller is the particle size of the formed droplets.

According to the present disclosure, in the step (J3), the silicone resin is used in an amount of 30-50 parts by weight, the emulsifier is used in an amount of 3-7 parts by weight, and the oil phase is used in an amount of 150-200 parts by weight, relative to 100 parts by weight of the total weight of the first monomer and the second monomer.

According to the present disclosure, the mixing solution D is added into the mixing solution C to contact with the mixing solution C in the step (J4), it is preferable that under a high-speed stirring condition, the stirring rate is within a range of 10,000-15,000 r/min, and the stirring time is within a range of 30-60 min; more preferably, the high-speed stirring rate is 10,000 r/min, and the stirring time is 60 min, such that the oil-in-water emulsion is obtained by stirring.

According to the present disclosure, the prepolymer solution in step (J5) is gradually dropwise added to the oil-in-water emulsion used as the core material, the mixture is stirred at a rotation speed of 1,500-3,500 r/min and subjected to reaction for 3-5 h, the water bath temperature is 30-40° C. throughout the whole process, the reaction product is subjected to filtration, washing, and vacuum drying for 24-48 h to obtain the capsule material.

A fifth aspect of the present disclosure provides a temperature-sensitive gel comprising a gel main agent and a cross-linking agent, wherein the cross-linking agent is the aforesaid silicone resin or the aforesaid silicone resin capsule.

According to the present disclosure, a weight ratio of the content of said gel main agent to the content of said cross-linking agent is (40-60):(1-5); preferably (50-60):1.

According to the present disclosure, the gel main agent is at least one selected from the group consisting of pullulan α-glucan, cyciocoral spermine, and β-1,3-glucan, preferably β-1,3-glucan.

According to the present disclosure, the cross-linking agent of the temperature-sensitive gel is a high-temperature-resistant cross-linking agent, wherein the preparation method is as described above, wherein the cross-linking agent is encapsulated by the temperature-sensitive capsule shell, the shell has a thickness of 1-40 μm, the degradation temperature range can be adjusted according to the formation temperature, and the cross-linking agent is disposed inside the capsule.

A sixth aspect of the present disclosure provides a modified settable material, wherein the modified settable material has the structure represented by Formula (2) or Formula (3):

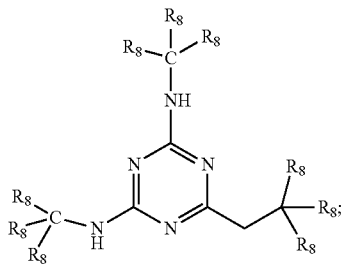

Formula (2)

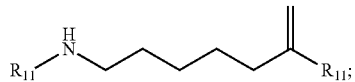

Formula (3)

wherein $R_8$ and $R_{11}$ are the same or different, and each is $CH_3CH_2OH$, $CH_2OH$ or $CH_3CH_3CH_3CH_2OH$.

According to a preferred embodiment of the present disclosure, the modified settable material has the structure represented by Formula (4):

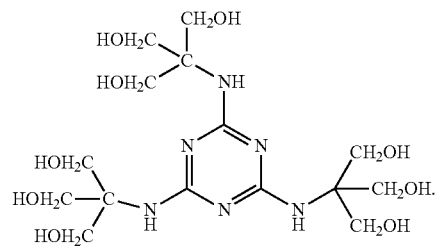

Formula (4)

According to another preferred embodiment of the present disclosure, the modified settable material has the structure represented by Formula (5):

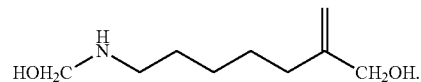

Formula (5)

In the present disclosure, although the settable material is hydrophilic, it has relatively poor bonding with the gel and cement. In order to allow the settable material to be desirably bond with the gel and cement, a surface of the settable material may be grafted with a plurality of hydroxyl groups to form hydrogen bonds with water molecules, thereby increasing the acting force and enhancing strength of the composite gel plugging agent.

A seventh aspect of the present disclosure provides a method for preparing the aforesaid modified settable material including:

(K1) contacting a settable material, a modifying co-agent and water to obtain a mixed solution E;

(K2) reacting the mixed solution E, a alkaline solution containing monomer A and monomer B with an alcohol solution containing a surfactant to obtain the modified settable material;

wherein the monomer A is at least one selected from the group consisting of hydroxybenzenes, chlorobenzenes and benzoic acid, and the monomer B is at least one selected from the group consisting of furan formaldehyde, trans-2-hexenal and trimethylheptenal.

The surface grafting reaction mechanism of the settable materials is as follows: the monomer A forms the phenoloxygen anions under an alkaline condition, the substitution reactions are subsequently performed at the ortho-para position, the hydroxymethyl groups formed in the alkaline medium are relatively stable and react with an excessive amount of monomer B aldehyde to generate the dimethylol phenol and the trimethylol phenol. The condensation reaction between the methylol groups may introduce a plurality of hydroxyls to a surface of the material. In addition, an addition of surface active long chain alkane molecules results in steric repulsion interaction of the settable material particles and increases the binding action of the settable material in the subsequent molecular polymerization, such that it is more compatible with hydrogels and cement.

According to the present disclosure, the settable material in step (K1) is at least one selected from the group consisting of melamine formaldehyde resins, polyethyleneimine resins and polyamide epichlorohydrin resins; the modifying co-agent is at least one selected from the group consisting of nitrogen organic compound, organic amine and organic anhydride compound; the nitrogen-containing organic compound is at least one selected from the group consisting of 2,2-dimethyl-4-nitropentane, nitrobenzene and β-nitronaphthalene; the organic amine is at least one selected from the group consisting of hexamethylenetetramine, m-phenylenediamine and m-phenylenediamine; and the organic anhydride type compound is one selected from the group consisting of phthalic anhydride, acetic anhydride and chromic anhydride.

According to the present disclosure, the surfactant is at least one selected from the group consisting of γ-aminopropyltriethoxysilane, butadiene aluminate and ferrite.

According to the present disclosure, in step (K1), a certain amount of settable material is initially put into a container comprising deionized water, and an appropriate amount of a modifying co-agent is added, the temperature is raised to 60-80° C., the mixture is stirred at a rotation speed of 1,500-3,000 r/min for 1-2 h and blended uniformly, so as to obtain a mixed solution E.

According to the present disclosure, a certain amount of the surfactant is put into a certain amount of the anhydrous ethanol in step (K2), and stirred at a rotation speed of 1,000 to 3,000 r/min for 1-3 h, such that the materials are blended uniformly; the monomer A and the monomer B are put into a container provided with the sodium hydroxide solution, and stirred sufficiently to obtain the mixed solution of monomers; both the mixed solution E and the mixed solution of monomers are added into the surfactant solution, the mixture is stirred at a rotation speed of 1,000-3,000 r/min, and the temperature is raised to 40-80° C., the mixture is ultrasonically dispersed for 30-60 min, the nitrogen gas is then fed into the solution and subjected to reaction for 5-8 h, so as to obtain the modified settable material.

According to the present disclosure, the settable material is used in an amount of 18-50 parts by weight, the modifying agent is used in an amount of 3-5 parts by weight, the monomer A is used in an amount of 20-40 parts by weight, the monomer B is used in an amount of 40-60 parts by weight, the surfactant is used in an amount of 5-10 parts by weight, and the alcohol is used in an amount of 12-40 parts by weight, relative to 100 parts by weight of water.

In an eighth aspect, the present disclosure provides a water-based gel-consolidation type lost circulation material system, wherein the lost circulation material system comprises the aforesaid temperature-sensitive gel, and a modified settable material, a curing agent and a cement composition as previously mentioned.

According to the present disclosure, the curing agent comprises an intermediate temperature curing agent and a high temperature curing agent, wherein the intermediate temperature curing agent has a curing temperature within a range of 50-100° C., and the high temperature curing agent has a curing temperature within a range of 101-150° C.; in addition, a weight ratio of the used amount of the intermediate temperature curing agent and the high temperature curing agent is 1:(1.5-2). The intermediate temperature curing agent in combination with the high temperature curing agent can produce a gradient curing, which is conducive to increasing denseness of the composite gel plugging agent and reducing the filtrate loss of the gel solution in an initial stage. Along with a temperature-rise of the formation, the denseness of the gel plugging agent is gradually increased, the high temperature curing agent starts to participate in the polymerization reaction, and the curing cycle of the high temperature curing agent is shortened due to the function of said intermediate temperature curing agent, thereby increasing the strength of the composite gel plugging agent.

According to the present disclosure, the intermediate temperature curing agent is at least one selected from the group consisting of cycloaliphatic polyamines, tertiary amines and boron trifluoride complexes, preferably cycloaliphatic polyamines; the high temperature curing agent is at least one selected from the group consisting of aromatic polyamine, anhydride and hydrazide, preferably hydrazide.

It is further defined that in the present disclosure that the temperature-sensitive gel is 40-60 parts by weight, the modified settable material is 15-35 parts by weight, the curing agent is 8-20 parts by weight, and the cement composition is 20-40 parts by weight, relative to 100 parts by weight of water; preferably, the temperature-sensitive gel is 40-50 parts by weight, the modified settable material is 15-25 parts by weight, the curing agent is 9-15 parts by weight, and the cement composition is 25-35 parts by weight, relative to 100 parts by weight of water.

According to the present disclosure, the cement composition comprises at least one selected from the group consisting of cement, emulsifier, inert material, filtrate reducer, retarder, lightening admixture and suspension stabilizer.

According to the present disclosure, the cement is at least one selected from the group consisting of Portland cement, superfine cement and magnesium oxychloride cement, preferably superfine cement; the emulsifier is at least one selected from the group consisting of polyoxypropylene ether, propylene epoxide block copolymer and polyol fatty acid ester, preferably polyoxypropylene ether; the inert material is at least one selected from the group consisting of walnut shell, fiber and bitumen, preferably walnut shell; the filtrate reducer is at least one selected from the group consisting of vinylpyridine, ethylene sulfonate and hydroxyethylacrylic acid, preferably vinylpyridine; the retarder is at least one selected from the group consisting of calcium of molasses, citric acid and lignosulfonate, preferably citric acid; the lightening admixture is at least one selected from the group consisting of fly ash, microbeads and bentonite, preferably microbeads; the suspension stabilizer is at least one selected from the group consisting of carboxymethylcellulose, sodium alginate and sodium metasilicate, preferably sodium metasilicate.

Further, in the present disclosure, the cement is used in an amount of 10-40 parts by weight, the emulsifier is used in an amount of 0-7 parts by weight, the inert material is used in an amount of 3-10 parts by weight, the filtrate reducer is used in an amount of 2-8 parts by weight, the retarder is used in an amount of 2-8 parts by weight, the amount of the lightening admixture is used in an amount of 1-7 parts by weight, and the suspension stabilizer is used in an amount of 3-7 parts by weight, relative to 100 parts by weight of water.

Preferably, the cement is used in an amount of 10-30 parts by weight, the emulsifier is used in an amount of 1-6 parts by weight, the inert material is used in an amount of 3-6 parts by weight, the filtrate reducer is used in an amount of 2-5 parts by weight, the retarder is used in an amount of 3-6 parts by weight, the amount of the lightening admixture is used in an amount of 2-5 parts by weight, and the suspension stabilizer is used in an amount of 3-5 parts by weight, relative to 100 parts by weight of water.

In a ninth aspect, the present disclosure provides an use of the aforesaid plugging agent in a fractured lost circulation formation.

According to the present disclosure, the fractured lost circulation refers to the lost circulation and loss caused by a fractured formation, wherein the fractured formation comprises a loss rate of 20-50 m$^3$/h, a temperature of 80-140° C., and a fracture width of 1-3 mm.

The present disclosure will be described in detail below with reference to examples.

Unless otherwise specified, the raw materials used in the examples are commercially available conventional materials.

The test instrument was a high-temperature and high-pressure displacement device, and the specific operating steps were as follows: the maximum pressure-bearing plugging pressure of the dispersion liquids of the prepared water-based gel-consolidation type lost circulation material system was measured by using the simulated fracture plugging test: a high-temperature and high-pressure dynamic plug evaluation apparatus was utilized, a heating switch of the high-temperature and high-pressure dynamic plug evaluation apparatus was turned on, the formation temperature on a temperature controller was set, and the formation temperature condition was simulated; the dispersion liquid of the water-based gel-consolidation type lost circulation material system was respectively injected into a core holder equipped with a steel column fracture core model, the dispersion liquid of the water-based gel-consolidation type lost circulation material system was introduced into the fracture core model, the injection volume was a given value, after the injection was completed, a constant current pump was powered on, the drilling fluid was slowly injected into the core holder, the injection pressure was recorded in real time, until the drilling fluid flowed out at an exit end of the core holder, which indicated that the plugging layer of the dispersion liquid in the water-based gel-consolidation type lost circulation material system in the fracture was broken through, the measured highest pressure value was exactly the maximum pressure-bearing plugging pressure of the dispersion liquid of the water-based gel-consolidation type lost circulation material system.

Preparation Example 1

The present preparation example served to illustrate the preparation of the silicone resin of the present disclosure.

(Y1) 3 parts by weight of ethanol, 3 parts by weight of hydrochloric acid and 30 parts by weight of water were subjected to a first contact, and stirred with a rotation speed of 300 r/min at room temperature for 3 h, the materials were blended uniformly to obtain a mixed solution A;

(Y2) 30 parts by weight of methyl orthosilicate, 20 parts by weight of hydroxypropyl methacrylate and 100 parts by weight of water were subjected to a second contact, then subjected to a second contact with the deionized water contained in a three-port flask; the mixed solution in the three-port flask was continuously stirred, and put in a water bath, the temperature was adjusted to 45° C., the mixed solution was continuously stirred for 45 min to obtain a mixed solution B;

(Y3) 4 parts by weight of tert-butyl peroxobenzoate and 8 parts by weight of bis-2,4-dichlorobenzoyl peroxide were initially weighted and poured into a container comprising 100 parts by weight of deionized water, and subjected to stirring for 15 min to obtain an initiator solution. The mixing solution A was then added into the mixing solution B, the reaction temperature was adjusted to 95° C., the mixed solution was continuously stirred, the initiator solution was added, and the reaction was terminated after 6 h, so as to obtain a high-temperature organic cross-linking agent; the hydrochloric acid solution on the product was removed, the pH was adjusted to neutral, the product was finally subjected to precipitation isolation, washing, and drying at 70° C. for 20 h, and grinding at a grinding rotational speed of 25,000 r/min for 4 min, such that the solid-phase cross-linking agent in powder form was prepared.

The prepared silicone resin produced had the structural Formula:

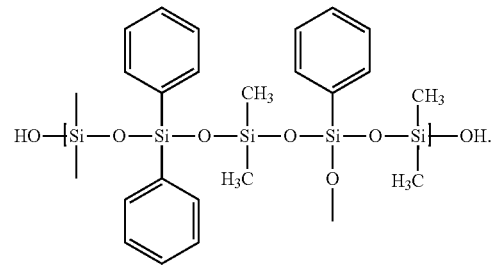

Preparation Example 2

The present preparation example served to illustrate the preparation of the silicone resin of the present disclosure.

(Y1) 3 parts by weight of ethanol, 3 parts by weight of hydrochloric acid and 30 parts by weight of water were subjected to a first contact, and stirred with a rotation speed of 300 r/min at room temperature for 3 h, the materials were blended uniformly to obtain a mixed solution A;

(Y2) 30 parts by weight of methyl orthosilicate, 10 parts by weight of hydroxypropyl methacrylate and 100 parts by weight of water were subjected to a second contact, then subjected to the second contact with the deionized water contained in a three-port flask; the mixed solution in the three-port flask was continuously stirred, and put in a water bath, the temperature was adjusted to 45° C., the mixed solution was continuously stirred for 45 min to obtain a mixed solution B;

(Y3) 4 parts by weight of tert-butyl peroxobenzoate and 8 parts by weight of ethylene glycol dimethacrylate were initially weighted and poured into a container comprising 100 parts by weight of deionized water, and subjected to stirring for 15 min to obtain an initiator solution. The mixing solution A was then added into the mixing solution B, the reaction temperature was adjusted to 95° C., the mixed solution was continuously stirred, the initiator solution was added, and the reaction was terminated after 6 h, so as to obtain a high-temperature organic cross-linking agent; the hydrochloric acid solution on the product was removed, the pH was adjusted to neutral, the product was finally subjected to precipitation isolation, washing, and drying at 80° C. for 12 h, and grinding at a grinding rotational speed of 20,000 r/min for 5 min, such that the solid-phase cross-linking agent in powder form was prepared.

The prepared silicone resin produced had the structural Formula:

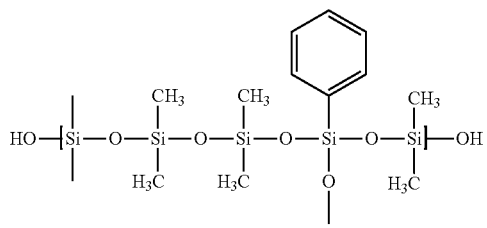

Preparation Example 3

The present preparation example served to illustrate the preparation of the modified silicone resin of the present disclosure.

(K1) 18 parts by weight of melamine formaldehyde resin was initially placed in a container comprising 100 parts by weight of deionized water, and 3 parts by weight of organic amine m-phenylenediamine was added, the mixture was heated to 65° C., and stirred at a rotational speed of 1,500 r/min for 1 h and blended uniformly to obtain a mixed solution E;

(K2) 6 parts by weight of the surfactant γ-aminopropyl-triethoxysilane was weighted and placed in 12 parts by weight of anhydrous ethanol, the mixture was stirred at a rotation speed of 1,000 r/min for 1-3 h and blended uniformly to obtain a γ-aminopropyltriethoxysilane solution;

20 parts by weight of the monomers A hydroxybenzene and 40 parts by weight of the monomer B trimethylheptenal were placed in a container comprising a solution of sodium hydroxide, the mixture was stirred sufficiently to obtain a mixed monomer solution;

the mixed solution E and the mixed monomer solution were added to the γ-aminopropyltriethoxysilane solution, the mixture was stirred at a rotation speed of 1,500 r/min, and heated to 80° C., ultrasonically dispersed for 60 min, nitrogen gas was then introduced into the solution to carry out reaction for 6 h so as to obtain the modified settable material.

The prepared modified settable material had the structural Formula:

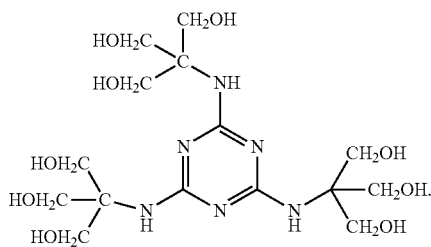 [SMILES: OCC(CO)(CO)Nc1nc(NC(CO)(CO)CO)nc(NC(CO)(CO)CO)n1]

Preparation Example 4

The present preparation example served to illustrate the preparation of the modified silicone resin of the present disclosure.

(K1) 18 parts by weight of polyamide epichlorohydrin resin was initially put into a container comprising 100 parts by weight of deionized water, and 3 parts by weight of m-phenylenediamine was added, the mixture was heated to 65° C., and stirred at a rotational speed of 1,500 r/min for 1 h and blended uniformly to obtain a mixed solution E;

(K2) 6 parts by weight of the surfactant γ-aminopropyl-triethoxysilane was weighted and placed in 12 parts by weight of anhydrous ethanol, the mixture was stirred at a rotation speed of 1,000 r/min for 1-3 h and blended uniformly to obtain a γ-aminopropyltriethoxysilane solution;

20 parts by weight of the monomers A hydroxybenzene and 20 parts by weight of the monomer B trimethylheptenal were placed in a container comprising a solution of sodium hydroxide, the mixture was stirred sufficiently to obtain a mixed monomer solution;

the mixed solution E and the mixed monomer solution were added to the γ-aminopropyltriethoxysilane solution, the mixture was stirred at a rotation speed of 1,500 r/min, and heated to 80° C., ultrasonically dispersed for 60 min, nitrogen gas was then introduced into the solution to carry out reaction for 6 h so as to obtain the modified settable material.

The prepared modified settable material had the structural Formula:

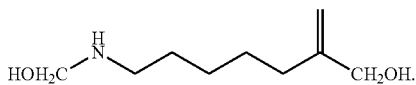

Preparation Example 5

The present preparation example served to illustrate the preparation of silicone resin capsule.

(J1) 16 parts by weight of the first monomer trimethyl-aminomethane was added into a container comprising toluene, 34 parts by weight of an aqueous solution of the second monomer xylylene diisocyanate was added, the pH of the solution was adjusted to 4, the temperature was adjusted by heated the solution in an oil bath at 95° C., nitrogen gas was introduced to carry out reaction till completion of the reaction, a prepolymer solution was prepared; it was cooled to room temperature for use;

(J2) 5 parts by weight of a polymer material gelatin was weighted and contacted with 100 parts by weight of deionized water contained in a container, 6 parts by weight of a cross-linking agent divinylbenzene and 5 parts by weight of a water-soluble binder carboxymethyl cellulose were added, the mixture was heated to 85° C., and stirred at a rotational speed of 2,500 r/min for 2 h, the materials were sufficiently dissolved and the mixture was cooled to room temperature to obtain a mixed solution C;

(J3) 2 parts by weight of an emulsifier sorbitan monooleate was dissolved in 100 parts by weight of oil phase white oil, and 25 parts by weight of a core material silicone resin was added under the stirring condition, wherein the silicone resin was prepared from the preparation example 1; the water bath temperature was adjusted to 80° C., the mixture was subjected to stirring at a rotational speed of 2,000 r/min and emulsification for 2 h to obtain a mixed solution D;

(J4) the mixed solution D was contacted with the mixed solution C under the stirring condition, the mixture was subjected to stirring at a high speed of 10,000 r/min for 60 min, so as to obtain an oil-in-water emulsion;

(J5) the prepolymer solution was gradually and dropwise added into the core material oil-in-water emulsion, the mixture was stirred at a rotational speed of 2,500 r/min to carry out reaction for 4 h, the water bath temperature throughout the process was 35° C., the reaction product was subjected to filtration, washing, and vacuum-drying for 48 h to obtain the capsule material.

Example 1

The present example served to illustrate the preparation of the water-based gel-consolidation type lost circulation material system of the present disclosure.

The lost circulation rate of the fractured formation was 40 m³/h and the formation temperature was 100° C.

The lost circulation material system comprising the following parts by weight of the raw materials:

Temperature-sensitive gel: comprising 50 parts by weight of β-1,3-glucan as the main agent of the temperature-sensitive gel, and 3 parts by weight of the silicone resin prepared in preparation example 1 as the cross-linking agent;

Modified settable material: 20 parts by weigh of the modified settable material prepared in the preparation example 3;

Compound curing agent: comprising the intermediate temperature curing agent aliphatic cyclic polyamine and the high temperature curing agent hydrazide at a ratio of 1:1.5, the decomposition temperature of the capsule shell was 90° C., 3 parts by weight of the intermediate temperature curing agent and 4.5 parts by weight of the high temperature curing agent were used, respectively;

Cement portion: including 100 parts by weight of water, 3 parts by weight of the emulsifier polyoxypropylene ether, 20 parts by weight of the superfine cement, 5 parts by weight of the inert material walnut shell, 3 parts by weight of the filtrate reducer vinylpyridine, 5 parts by weight of the retarder citric acid, 4 parts by weight of the lightening admixture microbeads, and 3 parts by weight of the suspension stabilizer sodium metasilicate.

(1) The temperature-sensitive gel main agent was added into a container comprising 100 parts by weight of deionized water, the container was placed on a magnetic stirrer and stirred at a rotation speed of 1,500 r/min for 1 h to obtain a mixed solution A;

(2) The cross-linking agent was encapsulated with the temperature-sensitive capsule shell having a thickness of 2 μm, the wall material of the shell was a polyurethane microcapsule shell, a decomposition temperature of the shell was 80° C., the temperature-sensitive capsule was placed in a mixing solution A, and continuously stirred at a rotational speed of 2,000 r/min, so as to obtain a mixing solution B;

(3) The modified settable material and the compound curing agent were placed in a container comprising 80 parts by weight of deionized water, and stirred at a rotational speed of 2,000 r/min for 15 min, so as to obtaining a mixed solution C;

(4) The inorganic curing main agents cement, inert material, filtrate reducer, retarder, lightening admixture, and suspension stabilizer were added into the aqueous solution D according to a certain sequence, the materials were stirring at a rotational speed of 3,000 r/min for 1 h, so as to obtain the mixed solution E;

(5) An aqueous solution of NaCl (i.e., brine) was added into the mixing solution A and stirred continuously, the mixing solution C and mixing solution E were subsequently added and stirred continuously for 1 h, to obtain the final product water-based gel-consolidated lost circulation material system, which was injected into the high-temperature and high-pressure displacement device, the injection pressure was recorded in real time, until the drilling fluid flowed out at an exit end of the core holder, which indicated that the plugging layer of the dispersion liquid in the water-based gel-consolidation type lost circulation material system in the fracture was broken through, the measured highest pressure value was exactly the maximum pressure-bearing plugging pressure of the dispersion liquid of the water-based gel-consolidation type lost circulation material system, the result was shown in Table 1; and the gel strength of the water-based gel-consolidated lost circulation material system was as shown in Table 2.

Example 2

The present example served to illustrate the preparation of the water-based gel-consolidation type lost circulation material system of the present disclosure.

The water-based gel-consolidation type lost circulation material system was prepared with the same method as that in Example 1, except that the content of the component temperature-sensitive gel was altered and the remainder was unchanged.

The temperature-sensitive gel comprising the following parts by weight of the raw materials:

Temperature-sensitive gel: comprising 40 parts by weight of β-1,3-glucan as the main agent of the temperature-sensitive gel, and 3 parts by weight of the silicone resin prepared in preparation example 1 as the cross-linking agent;

Modified settable material: 20 parts by weigh of the modified settable material prepared in the preparation example 3;

Compound curing agent: comprising the intermediate temperature curing agent aliphatic cyclic polyamine and the high temperature curing agent hydrazide at a ratio of 1:1.5, the decomposition temperature of the capsule shell was 90° C., 3 parts by weight of the intermediate temperature curing agent and 4.5 parts by weight of the high temperature curing agent were used, respectively;

Cement portion: including 100 parts by weight of water, 3 parts by weight of the emulsifier polyoxypropylene ether, 20 parts by weight of the superfine cement, 5 parts by weight of the inert material walnut shell, 3 parts by weight of the filtrate reducer vinylpyridine, 5 parts by weight of the retarder citric acid, 4 parts by weight of the lightening admixture microbeads, and 3 parts by weight of the suspension stabilizer sodium metasilicate.

(1) The temperature-sensitive gel main agent was added into a container comprising 100 parts by weight of deionized water, the container was placed on a magnetic stirrer and stirred at a rotation speed of 1,500 r/min for 1 h to obtain a mixed solution A;

(2) The cross-linking agent was encapsulated with the temperature-sensitive capsule shell having a thickness of 2 μm, the wall material of the shell was a polyurethane microcapsule shell, a decomposition temperature of the shell was 80° C., the temperature-sensitive capsule was placed in a mixing solution A, and continuously stirred at a rotational speed of 2,000 r/min, so as to obtain a mixing solution B;

(3) The modified settable material and the compound curing agent were placed in a container comprising 80 parts by weight of deionized water, and stirred at a rotational speed of 2,000 r/min for 15 min, so as to obtaining a mixed solution C;

(4) The inorganic curing main agents cement, inert material, filtrate reducer, retarder, lightening admixture, and suspension stabilizer were added into the aqueous solution D according to a certain sequence, the materials were stirring at a rotational speed of 3,000 r/min for 1 h, so as to obtain the mixed solution E;

(5) An aqueous solution of NaCl (i.e., brine) was added into the mixing solution A and stirred continuously, the mixing solution C and mixing solution E were subsequently added and stirred continuously for 1 h, to obtain the final product water-based gel-consolidated lost circulation material system, which was injected into the high-temperature and high-pressure displacement device, the injection pressure was recorded in real time, until the drilling fluid flowed out at an exit end of the core holder, which indicated that the plugging layer of the dispersion liquid in the water-based gel-consolidation type lost circulation material system in the fracture was broken through, the measured highest pressure value was exactly the maximum pressure-bearing plugging pressure of the dispersion liquid of the water-based gel-consolidation type lost circulation material system, the result was shown in Table 1; and the gel strength of the water-based gel-consolidated lost circulation material system was as shown in Table 2.

Example 3

The present example served to illustrate the preparation of the water-based gel-consolidation type lost circulation material system of the present disclosure.

The water-based gel-consolidation type lost circulation material system was prepared with the same method as that in Example 1, except that the content of the component temperature-sensitive gel was altered and the remainder was unchanged.

The temperature-sensitive gel comprising the following parts by weight of the raw materials:

Temperature-sensitive gel: comprising 60 parts by weight of β-1,3-glucan as the main agent of the temperature-sensitive gel, and 3 parts by weight of the silicone resin prepared in preparation example 1 as the cross-linking agent;

Modified settable material: 20 parts by weigh of the modified settable material prepared in the preparation example 3;

Compound curing agent: comprising the intermediate temperature curing agent aliphatic cyclic polyamine and the high temperature curing agent hydrazide at a ratio of 1:1.5, the decomposition temperature of the capsule shell was 90° C., 3 parts by weight of the intermediate temperature curing agent and 4.5 parts by weight of the high temperature curing agent were used, respectively;

Cement portion: including 100 parts by weight of water, 3 parts by weight of the emulsifier polyoxypropylene ether, 20 parts by weight of the superfine cement, 5 parts by weight of the inert material walnut shell, 3 parts by weight of the filtrate reducer vinylpyridine, 5 parts by weight of the retarder citric acid, 4 parts by weight of the lightening admixture microbead, and 3 parts by weight of the suspension stabilizer sodium metasilicate.

(1) The temperature-sensitive gel main agent was added into a container comprising 100 parts by weight of deionized water, the container was placed on a magnetic stirrer and stirred at a rotation speed of 1,500 r/min for 1 h to obtain a mixed solution A;

(2) Cross-linking agent was encapsulated with the temperature-sensitive capsule shell having a thickness of 2 μm, the wall material of the shell was a polyurethane microcapsule shell, a decomposition temperature of the shell was 80° C., the temperature-sensitive capsule was placed in a mixing solution A, and continuously stirred at a rotational speed of 2,000 r/min, so as to obtain a mixing solution B;

(3) The modified settable material and the compound curing agent were placed in a container comprising 80 parts by weight of deionized water, and stirred at a rotational speed of 2,000 r/min for 15 min, so as to obtaining a mixed solution C;

(4) The inorganic curing main agents cement, inert material, filtrate reducer, retarder, lightening admixture, and suspension stabilizer were added into the aqueous solution D according to a certain sequence, the materials were stirring at a rotational speed of 3,000 r/min for 1 h, so as to obtain the mixed solution E;

(5) An aqueous solution of NaCl (i.e., brine) was added into the mixing solution A and stirred continuously, the mixing solution C and mixing solution E were subsequently added and stirred continuously for 1 h, to obtain the final product water-based gel-consolidated lost circulation material system, which was injected into the high-temperature and high-pressure displacement device, the injection pressure was recorded in real time, until the drilling fluid flowed out at an exit end of the core holder, which indicated that the plugging layer of the dispersion liquid in the water-based gel-consolidation type lost circulation material system in the fracture was broken through, the measured highest pressure value was exactly the maximum pressure-bearing plugging pressure of the dispersion liquid of the water-based gel-consolidation type lost circulation material system, the result was shown in Table 1; and the gel strength of the water-based gel-consolidated lost circulation material system was as shown in Table 2.

Example 4

The present example served to illustrate the preparation of the water-based gel-consolidation type lost circulation material system of the present disclosure.

The water-based gel-consolidation type lost circulation material system was prepared with the same method as that in Example 1, except that 10 parts by weight of the modified settable material prepared from the preparation example 3 were used.

The measurement results of the finally prepared water-based gel-consolidation type lost circulation material system were shown in Table 1; and the gel strength of the water-based gel-consolidated lost circulation material system was as shown in Table 2.

Example 5

The present example served to illustrate the preparation of the water-based gel-consolidation type lost circulation material system of the present disclosure.

The water-based gel-consolidation type lost circulation material system was prepared with the same method as that in Example 1, except that the cross-linking agent was the silicone resin cross-linking agent prepared in preparation example 2.

The measurement results of the finally prepared water-based gel-consolidation type lost circulation material system were shown in Table 1; and the gel strength of the water-based gel-consolidated lost circulation material system was as shown in Table 2.

Example 6

The present example served to illustrate the preparation of the water-based gel-consolidation type lost circulation material system of the present disclosure.

The water-based gel-consolidation type lost circulation material system was prepared with the same method as that in Example 1, except that the modified settable material was the modified settable material prepared in preparation example 4.

The measurement results of the finally prepared water-based gel-consolidation type lost circulation material system were shown in Table 1; and the gel strength of the water-based gel-consolidated lost circulation material system was as shown in Table 2.

Example 7

The present example served to illustrate the preparation of the water-based gel-consolidation type lost circulation material system of the present disclosure.

The water-based gel-consolidation type lost circulation material system was prepared with the same method as that in Example 1, except that 15 parts by weight of the modified settable material prepared from the preparation example 3 were used.

The measurement results of the finally prepared water-based gel-consolidation type lost circulation material system were shown in Table 1; and the gel strength of the water-based gel-consolidated lost circulation material system was as shown in Table 2.

Example 8

The present example served to illustrate the preparation of the water-based gel-consolidation type lost circulation material system of the present disclosure.

The water-based gel-consolidation type lost circulation material system was prepared with the same method as that in Example 1, except that 10 parts by weight of the cement were used.

The measurement results of the finally prepared water-based gel-consolidation type lost circulation material system were shown in Table 1; and the gel strength of the water-based gel-consolidated lost circulation material system was as shown in Table 2.

Example 9

The present example served to illustrate the preparation of the water-based gel-consolidation type lost circulation material system of the present disclosure.

The water-based gel-consolidation type lost circulation material system was prepared with the same method as that in Example 1, except that the silicone resin capsule prepared from the preparation example 5 was used.

The measurement results of the finally prepared water-based gel-consolidation type lost circulation material system were shown in Table 1; and the gel strength of the water-based gel-consolidated lost circulation material system was as shown in Table 2.

Comparative Example 1

The lost circulation rate of the fractured formation was 40 m$^3$/h and the formation temperature was 100° C.

The water-based gel-consolidation type lost circulation material system was prepared according to the same method as that in Example 1, except that the modified settable material was not used; i.e., the junction function of the modified settable material between two materials was removed. In Comparative Example 1, there was no modified settable material in the water-based gel consolidation system, and the modified settable material was removed from the water-based gel-consolidation type lost circulation material system.

The measurement results of the finally prepared water-based gel-consolidation type lost circulation material system were shown in Table 1; and the gel strength of the water-based gel-consolidated lost circulation material system was as shown in Table 2.

Comparative Example 2

The lost circulation rate of the fractured formation was 40 m$^3$/h and the formation temperature was 100° C.

The water-based gel-consolidation type lost circulation material system was prepared according to the same method as that in Example 1, except that the "modified settable material" was replaced with the "settable material"; that is, the settable material was added in an ungrafted state, the settable material was not modified in Comparative Example 2, and the settable material was present in the water-based gel consolidation system, but it was not modified by grafting on the surface thereof.

The measurement results of the finally prepared water-based gel-consolidation type lost circulation material system were shown in Table 1; and the gel strength of the water-based gel-consolidated lost circulation material system was as shown in Table 2.

Comparative Example 3

The water-based gel-consolidation type lost circulation material system was prepared according to the same method as that in Example 1, except that:

the "cross-linking agent prepared in the Preparation Example 1" was replaced with "N—N methylene bis-acrylamide", that is, the silicone resin prepared in the present disclosure was not used.

The measurement results of the finally prepared water-based gel-consolidation type lost circulation material system were shown in Table 1; and the gel strength of the water-based gel-consolidated lost circulation material system was as shown in Table 2.

Comparative Example 4

The water-based gel-consolidation type lost circulation material system was prepared according to the same method as that in Example 1, except that the decomposition temperature of the capsule shell was 60° C., and the shell had a thickness of 10 μm, the wall material of the shell was polyurethane microcapsule shell.

The measurement results of the finally prepared water-based gel-consolidation type lost circulation material system were shown in Table 1; and the gel strength of the water-based gel-consolidated lost circulation material system was as shown in Table 2.

Comparative Example 5

The plugging of fractures was performed in the Comparative Example merely by using an inorganic plugging material, wherein the inorganic plugging material was the superfine cement. The measurement results were shown in Table 1.

TABLE 1

| Numbers | Maximum pressure-bearing plugging pressure, MPa | | | | |
|---|---|---|---|---|---|
| | 1(h) | 2(h) | 3(h) | 4(h) | 5(h) |
| Example 1 | 4.1 | 5.7 | 7.6 | 8.9 | 5.5 |
| Example 2 | 4.4 | 5.6 | 7.9 | 8.7 | 5.7 |
| Example 3 | 3.9 | 5.6 | 7.3 | 8.4 | 5.4 |
| Example 4 | 3.6 | 4.7 | 6.6 | 7.5 | 5.5 |
| Example 5 | 3.7 | 4.6 | 6.5 | 7.0 | 5.2 |
| Example 6 | 3.8 | 4.7 | 6.6 | 7.2 | 5.5 |
| Example 7 | 4.1 | 5.3 | 6.8 | 7.7 | 5.6 |
| Example 8 | 3.7 | 4.8 | 6.7 | 7.4 | 5.3 |
| Comparative Example 1 | 2.4 | 3.6 | 4.2 | 5.0 | 2.7 |
| Comparative Example 2 | 3.3 | 3.8 | 5.1 | 5.8 | 3.9 |
| Comparative Example 3 | 2.7 | 3.4 | 4.6 | 5.2 | 2.9 |
| Comparative Example 4 | 3.5 | 4.1 | 5.4 | 6.2 | 4.3 |
| Comparative Example 5 | 1.2 | 2.6 | 3.5 | 4.3 | 2.8 |

As can be seen from the results of Table 1, the water-based gel-consolidation type lost circulation material system of the present disclosure has desirable pressure-bearing plugging performance in the process of plugging the fractured formation.

TABLE 2

| Numbers | Gel strength, MPa | | | | |
|---|---|---|---|---|---|
| | 1(h) | 2(h) | 3(h) | 4(h) | 5(h) |
| Example 1 | 4.5 | 6.2 | 7.9 | 9.3 | 9.3 |
| Example 2 | 5.0 | 6.1 | 7.8 | 9.0 | 9.0 |
| Example 3 | 4.4 | 5.8 | 7.4 | 8.8 | 8.8 |
| Example 4 | 4.2 | 5.5 | 7.1 | 7.8 | 7.8 |
| Example 5 | 4.4 | 5.2 | 7.0 | 7.4 | 7.4 |
| Example 6 | 4.7 | 5.3 | 7.0 | 7.6 | 7.6 |
| Example 7 | 4.4 | 5.7 | 7.5 | 8.0 | 8.0 |
| Example 8 | 3.9 | 5.0 | 6.9 | 7.6 | 7.6 |
| Comparative Example 1 | 2.9 | 4.0 | 4.4 | 5.3 | 5.3 |
| Comparative Example 2 | 3.7 | 4.3 | 5.5 | 6.2 | 6.2 |
| Comparative Example 3 | 3.3 | 3.6 | 5.2 | 5.8 | 5.8 |
| Comparative Example 4 | 3.7 | 4.4 | 5.7 | 6.7 | 6.7 |
| Comparative Example 5 | 1.4 | 3.1 | 3.9 | 4.5 | 4.5 |

As illustrated by the results of Table 2, Examples 1-9 of the water-based gel-consolidation type lost circulation material system of the present disclosure have desired gel strength, wherein the gel strength of the water-based gel-consolidation type lost circulation material system in Example 1 is 9.3 MPa after 4 hours. The modified settable material is not added in the Comparative Example 1, there is not the cohesion between gel and cement, the gel strength is low in the initial stage, and the gel strength reached 5.3 MPa after 4 hours. The settable material added in added in the Comparative Example 2 is in an ungrafted state, when compared with the Comparative Example 1, the gel strength at the initial stage is increased to 3.7 MPa, and the gel strength reached 6.2 MPa after 4 hours. In the Comparative Example 4, decomposition temperature of the capsule shell is 80° C., and the shell has a thickness of 10 μm; when compared with the Example 1, the thickness of said microcapsule shell is increased, the decomposition rate is slowed, resulting in the decreased gel strength in the initial stage, and the gel strength is 3.5 MPa after 1 hour, and the gel strength reaches a maximum value of 6.7 MPa after 4 hours. The fractures are plugged only with the separate inorganic plugging material in the Comparative Example 5, resulting in the decreased gel strength, and the gel strength reaches 4.5 MPa after 4 hours.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A silicone resin, wherein the silicone resin has a structure represented by Formula (1):

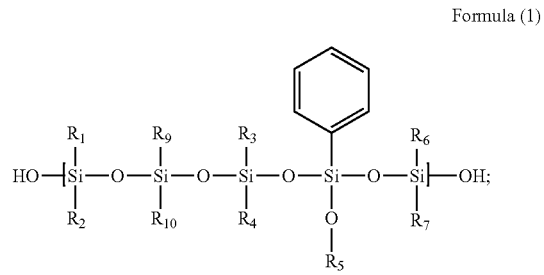

Formula (1)

where in Formula (1), $R_1$ is H; $R_2$ is H or an alkyl of $C_1$-$C_3$; $R_3$ is H or an alkyl of $C_1$-$C_4$; $R_4$ is H or an alkyl of $C_1$-$C_4$; $R_5$ is H or a benzene ring; $R_6$ is H or an alkyl of $C_1$-$C_4$; $R_7$ is H or an alkyl of $C_1$-$C_4$; $R_9$ and $R_{10}$ are the same or different, each is a phenyl group or an alkyl of $C_1$-$C_4$.

2. The silicone resin of claim 1, wherein each of $R_1$, $R_2$ and $R_5$ is H, each of $R_3$, $R_4$, $R_6$ and $R_7$ is $CH_3$; $R_9$ and $R_{10}$ are the same or different, each is a phenyl or $CH_3$.

3. The silicone resin of claim 1, wherein a preparation method of the silicone resin including:
   (Y1) subjecting an alcohol, an acid and a first water to a first contact to obtain a mixed solution A;
   (Y2) subjecting a silicon-containing monomer, an ethylenic monomer and a second water to a second contact to obtain a mixed solution B;
   (Y3) contacting the mixed solution A and the mixed solution B and carrying out reaction in the presence of an ester-containing peroxide initiator, a cross-linking agent and a third water, and subjecting reaction products to precipitation isolation, washing, drying and grinding treatment to prepare a silicone resin.

4. The silicone resin of claim 3, wherein the silicon-containing monomer is at least one selected from the group consisting of methyl orthosilicate, triethoxymethylsilane, dimethoxydiphenylsilane and trimethoxysilane;
   and/or, the ethylenic monomer is at least one selected from the group consisting of hydroxyethyl methacrylate, hydroxypropyl methacrylate and N-methylolacrylamide;
   and/or, the ester peroxide initiator is tert-butyl peroxobenzoate and/or tert-butyl peroxopentanoate;

and/or, the cross-linking agent is at least one selected from bis-2,4-dichlorobenzoyl peroxide, α-methylstyrene and ethylene glycol dimethacrylate.

5. The silicone resin of claim 3, wherein the alcohol is 10-20 parts by weight, and the acid is 5-10 parts by weight, relative to 100 parts by weight of the first water;

and/or, the silicon-containing monomer is 30-50 parts by weight, and the olefinic monomer is 20-30 parts by weight, relative to 100 parts by weight of the second water;

and/or, the ester peroxide initiator is 3-5 parts by weight, and the cross-linking agent is 8-10 parts by weight, relative to 100 parts by weight of the third water.

6. A temperature-sensitive gel, wherein the temperature-sensitive gel comprising a gel main agent and a cross-linking agent, wherein the cross-linking agent is the silicone resin of claim 1.

7. The temperature-sensitive gel of claim 6, wherein a weight ratio of the content of the gel main agent to the cross-linking agent is (40-60):(1-5).

8. The temperature-sensitive gel of claim 7, wherein a weight ratio of the content of the gel main agent to the cross-linking agent is (50-60):1.

9. The temperature-sensitive gel of claim 6, wherein the gel main agent is at least one selected from the group consisting of pullulan α-glucan, cyciocoral spermine and β-1,3-glucan.

\* \* \* \* \*